United States Patent [19]

Ohta et al.

[11] 4,412,802

[45] Nov. 1, 1983

[54] MOLDING DEVICE FOR FORMING A SOCKET END ON A PLASTIC PIPE

[75] Inventors: Ryozo Ohta; Tadao Yoshizawa; Masayuki Sakaguchi; Yoshiaki Hara; Junsuke Kyomen; Ryuichi Yoneda; Hidekazu Enomoto, all of Ishizukita, Japan

[73] Assignee: Kubota Ltd., Osaka, Japan

[21] Appl. No.: 250,036

[22] Filed: Apr. 1, 1981

Related U.S. Application Data

[62] Division of Ser. No. 80,035, Sep. 28, 1979, Pat. No. 4,279,853.

[30] Foreign Application Priority Data

Oct. 3, 1978 [JP] Japan .............................. 53-122326
Nov. 28, 1978 [JP] Japan .............................. 53-147402
Mar. 5, 1979 [JP] Japan .............................. 54-25899

[51] Int. Cl.³ .............................................. B29D 23/00
[52] U.S. Cl. .................................. 425/392; 425/393; 425/403; 425/DIG. 218
[58] Field of Search ...... 425/392, 393, 403, DIG. 218

[56] References Cited

U.S. PATENT DOCUMENTS

| 3,557,278 | 1/1971 | Kuhlemann . | |
|---|---|---|---|
| 3,677,684 | 7/1972 | Platz | 425/393 |
| 3,940,227 | 2/1976 | Strasser | 425/392 |
| 4,065,243 | 12/1977 | Acda et al. . | |
| 4,177,237 | 12/1979 | Ueno et al. . | |

FOREIGN PATENT DOCUMENTS 52-25871 7/1977 Japan .

*Primary Examiner*—Thomas P. Pavelko
*Attorney, Agent, or Firm*—Oblon, Fisher, Spivak, McClelland & Maier

[57] ABSTRACT

For the purpose of making a joint socket comprising at least two portions, namely a portion for receiving a plastic pipe end and another portion into which a rubber ring is fitted, a device for heating and softening a plastic pipe end and enlarging the radius of the softened pipe end to twice its size which includes, an inwardly slanted portion between a first outwardly slanted portion and a second outwardly slanted portion whose radius becomes smaller as it comes nearer to the front end thereof. As the result, the frictional resistance between an improved core and the radius enlarged softened pipe is reduced to a value which enables the device to be operated such that wall-thickened sockets can be made without loss of wall thickness subsequent to the radius enlarging process. The core for forming a molding space includes the first outwardly slanted portion, the inwardly slanted portion and the second outwardly slanted portion and which are necessary to perform the method can be expanded and shrunk so as to pass through the small and large radius portions of the molded socket and has a self-locking mechanism capable of resisting the resistance caused between the forcedly fed pipe and the core.

6 Claims, 17 Drawing Figures

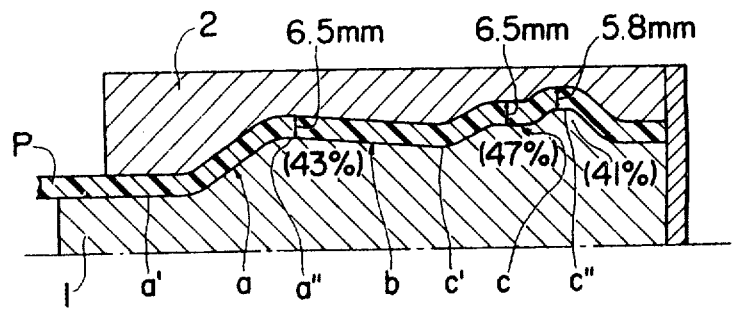
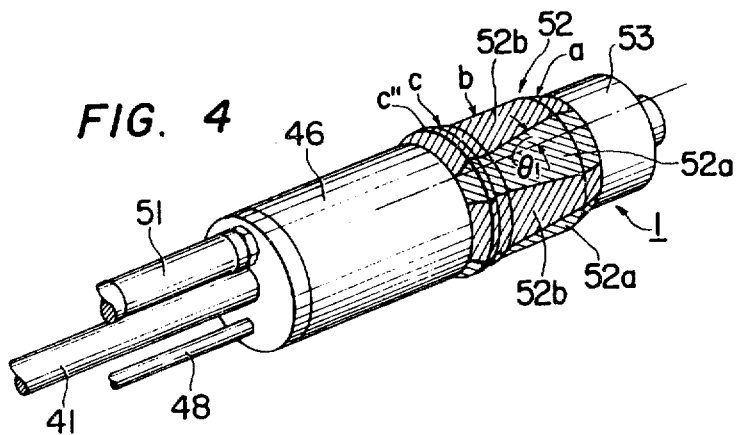
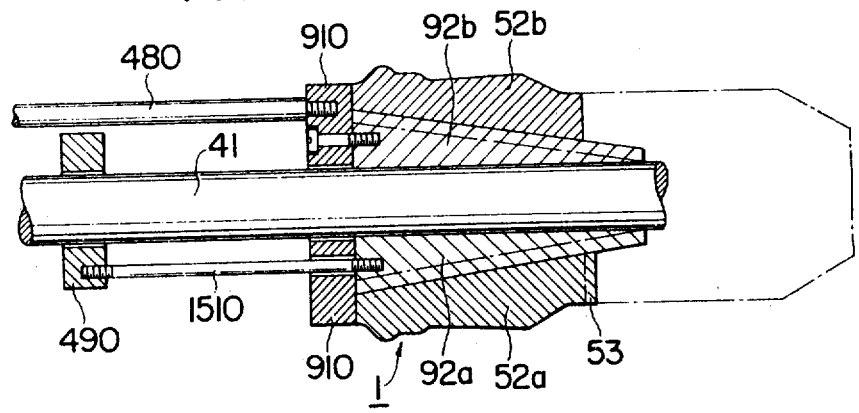

MOLDING DEVICE FOR FORMING A SOCKET END ON A PLASTIC PIPE

This is a division of application Ser. No. 080,035, filed Sept. 28, 1979 now U.S. Pat. No. 4,279,853.

BACKGROUND OF THE INVENTION

1. Field of the Invention

The present invention relates to movable molding device processing the end of a plastic pipe to form a pipe end socket. More particularly, the present invention relates to a device for molding PVC pipe joints.

2. Description of the Prior Art

U.S. Pat. No. 3,557,278 discloses a method of molding the end portion of a PVC pipe to form a wall-thickened socket including arranging an outer frame around a socket molding core, making the space formed between the core and the outer frame substantially equal to the wall thickness of PVC pipe, and forcedly pressing the heated end of PVC pipe into the space.

In FIGS. 1A through 1D attached hereto for reference, (a') repreents a slanted portion, (b') a linear portion and (c') a mountain or increased radius portion. (p') denotes the heat-softened end of PVC pipe, which is pressed into the space between the core and the outer frame by pushing the same. As shown in FIG. 1A, the wall of the softened end of PVC pipe is thickened by compression force (f) acting in the axial direction of pipe when it reaches the slanted portion (a').

As the forced insertion portion of pipe advances, the compression force becomes larger and, therefore, the sectional area of the pipe also becomes larger. However, since the radius of the pipe is also enlarged, the wall thickness of pipe portion whose radius has been enlarged is reduced and, as shown in FIG. 1B, a gap (g') is created at the linear portion (b') between the inner surface of outer frame and the outer surface of the pipe.

The thickness (d) of the gap (g') can be qualitatively understood as follows: Namely, assuming in FIG. 1B that the sectional area of PVC pipe at a point ($P_O$) is (S) and that the inner radius of the pipe is (r), the outer radius (R) of pipe can be expressed as follows:

$$\pi(R^2 - r^2) = S$$

Therefore, $$R = \sqrt{\frac{S}{\pi} + r^2}$$

Assuming that the distance of space between the core and the outer frame is (t), the thickness of gap can be expressed as follows:

$$d = t + r - R = t + r - \sqrt{\frac{S}{\pi} + r^2} \quad (1)$$

When the forced insertion of the PVC pipe end is further advanced and the foremost end of pipe comes to the first stepped portion ($c_1'$) of the portion of increased radius (c') as shown in FIG. 1C, the compression force (f) acting in the axial direction of pipe is further increased to thereby attain a high speed wall thickening effect, and the wall of the PVC pipe located at the linear portion is thickened by the compression force (f). However, according to the observation results conducted by the inventors of present invention and others, it has been found that, because the distance (d) of the gap (g') over the PVC pipe at the linear portion (b') is large, buckling occurs in the PVC pipe in the linear portion at the initial stage at which the wall of PVC pipe is thickened by the compression force and a crease is created on the outer surface of socket.

Further, Japanese Patent Publication No. 25871/52 discloses a processing method comprising a step of thickening wall of the softened plastic pipe end between the core and the outer frame without changing the inner radius of pipe; forming a suitably cooled film on the inner and outer circumferential walls of wall-thickened pipe end; feeding the wall-thickened end of pipe onto the radius enlarging portion of core to thereby reduce the thickness of that end and enlarge the inner radius thereof, said core having no outer frame; and projecting from the inside a ring-shaped projection at the region of this radius enlarging portion and molding an inner ring-shaped groove same as the shape of the projection in the inner circumferential wall of wall-thickened and radius-enlarged pipe end. However, it is impossible in this processing method to increase to such an extent as desired the thickness of the pipe end on the radius enlarging portion.

The method of molding the plastic pipe end to a wall-thickened socket requires a high level of engineering. The apparatus employed to carry out the processing method of U.S. Pat. No. 3,557,278 includes the structure in which half of the core is supported by a horizontal guide, while the remaining half of the core is supported by a vertical guide perpendicular to the horizontal guide, thus allowing the core to be drawn outside after the socket is molded. There is also disclosed a supporting mechanism large enough to resist a large resistance generated between the pipe and the core, but the use of this large resistance is primarily neglected.

SUMMARY OF THE INVENTION

An object of present invention is to provide a new method of processing the end of plastic pipe to form a pipe end socket wherein the space for molding the plastic pipe end to a socket includes a first outwardly slanted portion, a second outwardly slanted portion having a radius larger than that of the first outwardly slanted portion, and an inwardly slanted portion bridging the first and second outwardly slanted portions which becomes smaller in radius as it approaches to the second outwardly slanted portion, whereby, until the softened pipe and passes through the second outwardly slanted portion which has the largest radius, the increase of pipe wall is adequately controlled by the contraction deformation caused at the inwardly slanted portion, and a socket wall is molded to closely fit the molding space after the foremost end of pipe reaches the final end of molding space.

Another object of present invention is to provide a molding device employed to carry out the method of the present invention wherein, using the large resistance caused between the pipe and the core, movable core pieces for forming the molding space are stably supported and self-locked by their guiding members.

As a result of pursuing a reduction of moving resistance, avoidance of occurrence of creases, and increase of wall-thickening effect by balancing a variety of internal stresses such as expansion and contraction deformation in the circumferential and axial directions which are caused in the softened ring-shaped wall on the slanted portions due to the pushing pressure applied to the softened PVC pipe in the axial direction thereof, the present invention provides a method of molding the plastic pipe to a shape wherein the radius changes such that a core around which the softened plastic pipe is moved in the axial direction includes a first outwardly slanted portion whose radius increases in the pipe advancing direction, a second outwardly slanted portion arranged adjacent the first outwardly slanted portion and whose radius also increases in the pipe advancing direction, and an inwardly slanted portion extending from the top of first outwardly slanted portion to the valley portion of the second outwardly slanted portion and whose radius becomes smaller in the pipe advancing direction, whereby the softened plastic pipe is fed in the axial direction thereof into the molding space formed between the core and an outer frame, the outer frame having an inner surface corresponding to the profile of core, the softened pipe wall being subjected to expansion deformation in the circumferential direction at the first outwardly slanted portion and then shrunk in the circumferential direction and at the same time thickened in the radial direction at the inwardly slanted portion, and the softened pipe wall being passed through the second outwardly slanted portion with the shrunk and thickened wall portion.

From the equation (1), it is noted that:

$$\Delta d = \Delta r \left( \frac{\sqrt{\frac{S}{\pi} + r^2} - r}{\sqrt{\frac{S}{\pi} + r^2}} \right) > 0$$

Since it is obvious that the thickness (d) of gap can be reduced by reducing the radius (r) of core, the effect attained by the inwardly slanted portion is quite excellent.

As for the expansion deformation of the pipe wall which is urged in the circumferential direction by the outwardly slanted portion of core, the portion serving to enlarge the pipe wall in the radial direction, such deformation becomes greater as the slanted angle becomes larger than 15°, so that this large expansion deformation assists in similarly expansion-deforming the pipe wall in the circumferential direction just before reaching the outwardly slanted portion. When deformation like this occurs, the inner circumferential wall of pipe floats from the valley portion from which the slanted portion starts and, when viewed in the axial direction of pipe wall, it can be understood that a tensile force is caused in the axial direction.

The second process of present invention is then employed so as to not allow this floating movement or axially directed tensile force to prevent the softened pipe from being moved in the axial direction.

The axially directed tensile force created in the pipe wall is regarded as a main factor in causing excessive resistance to be generated against the axially directed movement of the softened pipe, the difference created in the deformation volume between the outer and inner circumferential walls of pipe thereby causing creases, an the wall-thickening effect to be reduced, the wall-thickening effect being necessary to prevent the reduction of wall thickness subsequent to the radius enalrging deformation. The axially directed tensile force can be effectively controlled by the method of present invention and the method of present invention enables a socket to be molded to have a wall slanted at 15°-60°, preferably 25°-45° and the necessary wall thickness.

The moldng device employed to carry out the method of present invention makes it possible to stably hold the divided core pieces in their respective positions even under the forcedly insertion of plastic pipe end. In one embodiment of molding device, first and second moving elements including several fingers arranged in a circle a given distance apart are freely movably positioned with the fingers of first and second moving elements arranged alternately, each of the fingers hving an upper tapered face which become lower in height as it approaches the front end thereof, each of divided core pieces forming a core assembly which is decreased in the radius thereof by the retreating movement of these moving elements being freely slidably engaged on the tapered upper face of each finger of moving elements, each divided core piece connected to each finger of the first moving element being freely slidably connected at the front end thereof to a base member so as to move only in the radial direction and each divided core piece connected to each finger of second moving element being urged at the rear end thereof to the rear end of first moving element.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 3A, 3B and 3C are views showing an example of pipe wall treating processes with varying values in the thickness of pipe wall.

FIG. 4 is a perspective view showing an embodiment of molding device employed to carry out the method of present invention.

FIG. 9 is a sectional view showing another embodiment of molding device having a self-locking mechanism preferable to carry out the pipe end socket processing method of present invention and a simple construction.

DETAILED DESCRIPTION OF THE PREFERRED EMBODIMENTS

Figure 1A:
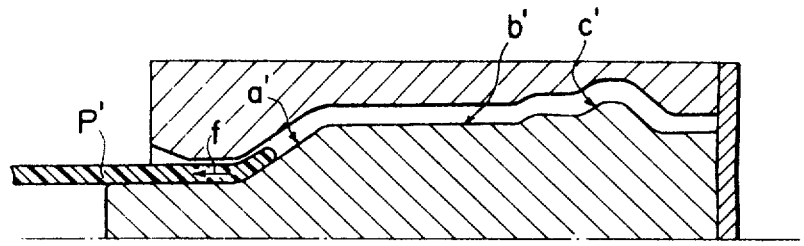
FIGS. 1A, 1B, 1C and 1D are sectional views showing a conventional method of processing the plastic pipe to form a pipe end socket.
Figure 1B:
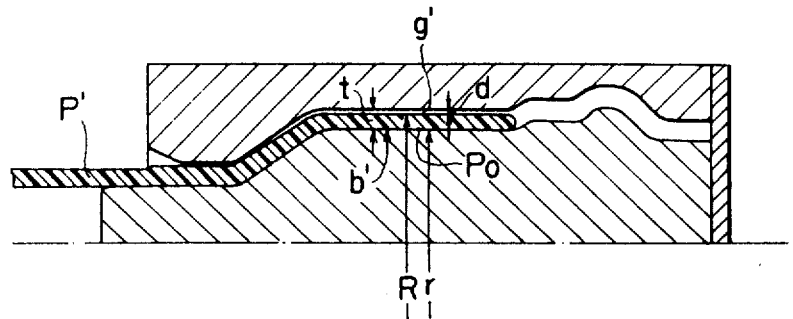
Figure 1C:
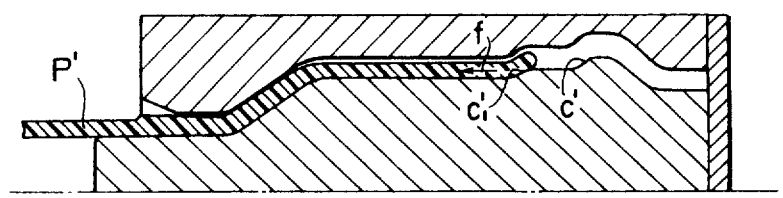
Figure 1D:
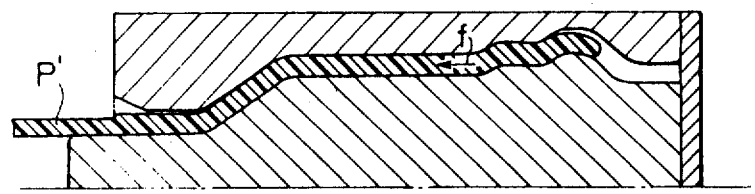
Figure 2A:
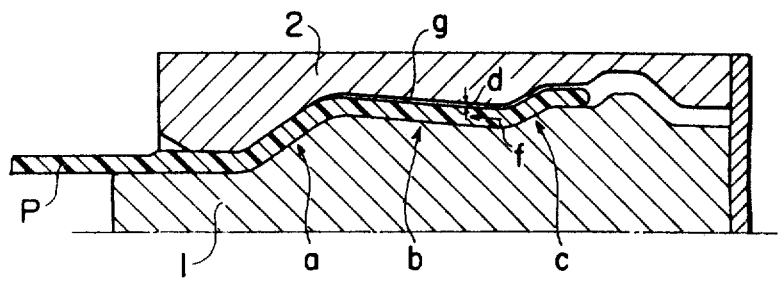
FIGS. 2A and 2B are sectional views showing the treating process of the pipe wall attained by the pipe end socket processing method of present invention.
Figure 2B:
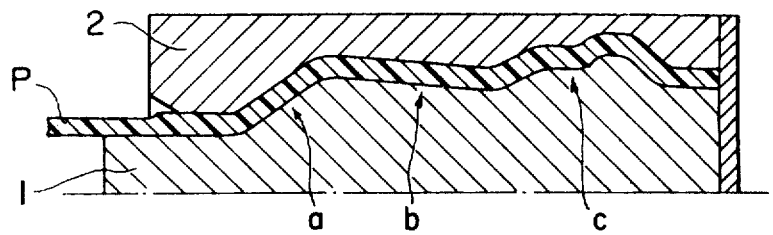

In FIGS. 2A and 2B reference numeral 1 represents a core, 2 an outer frame, and the space formed between the core 1 and the outer frame 2 is arranged to have same width as the wall thickness of the PVC pipe to be treated.

Symbol (a) represents a first outwardly slanted portion of core, (c) a second outwardly slanted portion thereof, and (b) an inwardly slanted portion thereof respectively. The profile of core 1 is formed to correspond to the shape of the socket to which the end portion of the PVC pipe is to be shaped. The angles at which the first and second outwardly slanted portions (a) and (c) are slanted are usually in the range of 30°–45°, and the negative angle at which the inwardly slanted portion (b) is slanted is in the range of 1°–5°. The end portion of PVC pipe is heated and softened and forced into the space formed between the core 1 and the outer frame 2 adding driving force to the PVC pipe.

FIG. 2A shows a stage of the method in which the forced insertion of the PVC pipe into the space between the core 1 and the outer frame 2 is advanced to a substantial extent. The volume increase in the cross section of the PVC pipe (P) at the respective positions of core 1 shown in FIG. 2A depends upon compression forces acted on the PVC pipe in the axial direction thereof. The PVC pipe located on the inwardly slanted portion (b) of core 1 in FIG. 2A is subjected to a substantially large compression force (f) due to the presence of second outwardly slanted portion (c) and the sectional area of PVC pipe is made larger than that of non-treated PVC pipe, but the volume increase in this sectional area has not come to such stage as of yet, at which time the space between the core 1 and the outer frame 2 is completely filled with the PVC pipe. Therefore, a gap (g) is still left between the outer surface of PVC pipe located on the inwardly slanted portion (b) and the inner surface of outer frame 2. However, as already described, the thickness of gap (g) can be made thinner than in the case where the portion (b) is horizontally arranged.

FIG. 2B shows another stage of the method in which the PVC pipe is finally forced into the space between the core 1 and the outer frame 2, and the insertion force at this final stage is larger than that at the intermediate stage shown in FIG. 2A. The gap (g) shown in FIG. 2A is eliminated by the forcedly inserted PVC pipe at this final stage.

The gap (g) formed between the outer surface of the PVC pipe located on the inwardly slanted portion and the inner surface of outer frame is long in length as shown in FIG. 2A. Therefore, when the gap (g) is greater, the PVC pipe will be extremely corrugated causing creases to be created before the gap (g) is fully filled with the transformed PVC pipe. However, the present invention enables the gap to be left small, thus allowing the abovementioned drawback to be avoided. Accordingly, the present invention allows the end portion of the PVC pipe to be formed as a socket having a desired wall thickness and no creases on the outer surface thereof.

Figure 3A:
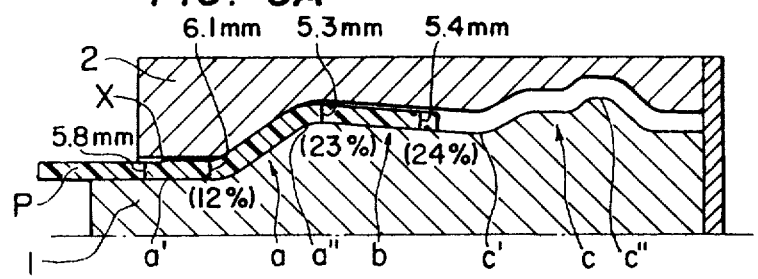

The result and feature attained by one embodiment of method of present invention are as follows: As shown in FIG. 3A, a wall thickened peak (X) can be recognized at the valley portion (a') to the softened PVC pipe which has reached the inwardly slanted portion (b) (angle:-3°) passing through the top (a") of the first outwardly slanted portion (a) (angle: 30°) of the molding ring-shaped space formed between the core 1 and the outer frame 2. The thickness of this wall thickening peak (X) is 6.1 mm relative to the original wall thickness of 5.8 mm of the PVC pipe, resulting in a 12% gain in wall thickness. The top (a") is 5.3 mm thick an the difference between the ring-shaped area of this top which is enlarged in the radius thereof and that of raw material pipe shows that a 23% gain has made in wall thickness. The softened PVC pipe coming to the halfway portion of inwardly slanted portion (b) is 5.4 mm thick, thus attaining a substantial wall thickening effect of 24%. These features are referred to as a first wall thickening effect.

The radius of ring shaped enlargement at the first outwardly slanted portion (a) is made smaller at this inwardly slanted portion (b) and, as described above, contraction in the radially inward direction and shrinking deformation in the axial direction can be created in the softened pipe wall (P) located at this area. In other words, natural contraction is attained in the circumferential and axial directions of pipe wall without any expanding deformation being forced, and the distribution of stresses in the pipe wall is equalized and stabilized so that the friction caused between the pipe wall, the core and the outer frame can be made small enough at this inwardly slanted portion (b).

In the course of movement in which the softened PVC pipe reaches to the stage shown in FIG. 3A, the pushing force for moving the softened pipe in the axial direction is subjected to only the resistance caused by the first outwardly slanted portion (a). Accordingly, the softened pipe can be smoothly moved by a pushing operation substantially neglecting the resistance at the inwardly slanted portion (b). When it reaches the second outwardly slanted portion (c), the softened pipe (P) is subjected to a second resistance. This second resistance applies a stable compression force to the softened pipe wall which has been substantially released from the forced deformation so that the pipe wall can be thickened to have a well controlled thickness at the inwardly slanted portion (b) and a wall thickening peak (Y) usually exists at a valley portion (c') thereof.

Figure 3B:
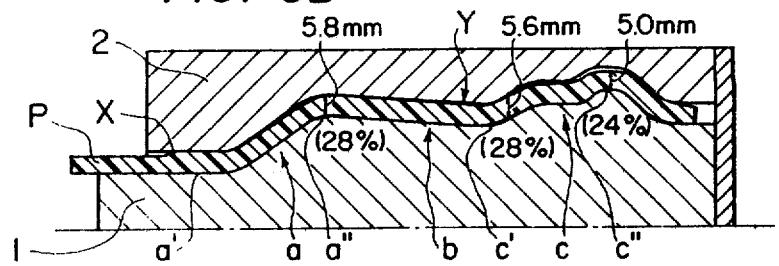

FIG. 3B shows the section of the softened PVC pipe wall having passed through the second outwardly slanted portion (c). In addition to the continuously existing wall thickening peak (X), the already described wall thickening peak (Y) (thickness: 5.9 mm, wall thickening rate: 29%) appears at the valley portion (c') on the inwardly slanted portion (b), and the thickness of top (a") is increased to 5.8 mm, which corresponds to a 28% increase in the wall thickening rate.

The thickness of pipe at the second outwardly slanted portion (c) is kept at 5.6 mm due to the presence of the normally present wall thickening peak (Y), with a wall thickening effect of 28% maintained, and the wall thickness of top (c") being kept at 5.0 mm, which corresponds to a wall thickening effect of 24%. These features are referred to as the second wall thickening effect.

After the softened pipe wall with the wall thickening effect added equally reduces the stresses which were first exerted on the softened pipe wall in the circumferential and axial directions thereof, it is moved to the area of second outwardly slanted portion (c) by adding a pushing force thereto in the axial direction thereof. Since the position of wall thickening peak (Y) is stable at the valley portion (c'), the expansion of pipe wall in the circumferential and axial directions thereof is equally caused at this area to thereby effectively restrain the strain deformation of pipe wall which is caused by the difference in the deformation volume between the outer and inner circumferential pipe walls, and is avoid the occurrence of creases. In other words, as long as the wall thickening peak (Y) is kept at a stable position on the inwardly slanted portion (b), it is possible to substantially stably maintain the stress distribution in the softened pipe wall at each of first and second outwardly slanted portions (a,c) and inwardly slanted portion (b) by means of a pushing force added to the pipe in the axial direction thereof. Accordingly, it can be realized that the friction between the softened pipe wall to be deformed the core 1 and the outer frame 2 is stabilized at a minimum value.

It is assumed for comparison that the inwardly slanted portion (b) is parallel to the axial direction of pipe (angle: 0°) or slanted at a small angle. Even if the wall thickening peak (Y) could be formed in this case, the position thereof would appear remote from the second outwardly slanted portion (c) but adjacent to the top (a") of first outwardly slanted portion (a). This is quite different from the effect of inwardly slanted portion (b), and the reaction force exerted from the top (a") is used to balance the reaction force caused by the second outwardly slanted portion (c).

If the inwardly slanted portion is not provided as described above, the position for balancing the reaction force created by the second outwardly slanted portion (c) will not be specified over the long axial distance area beginning at the valley portion (c') of second outwardly slanted portion and ending at the top (a") of first outwardly slanted portion, the contact condition between the softened pipe wall, the core and the outer frame will change freely at this area and the change in contact condition will cause a large frictional force to thereby unnecessarily increase the pushing force added to the pipe in the axial direction thereof. The method of present invention, therefore, can eliminate these drawbacks.

FIG. 3C shows a stage at which the softened PVC pipe comes to the final end of molding space to attain a final wall thickening effect, namely, a third wall thickening effect by which the molding space between the core and the outer frame is substantially completely filled with the softened PVC pipe wall. The gaps left between the bending surfaces of molding space and the pipe wall are eliminated by the reaction force coming back from the end of pipe, which has reached the final end of molding space, to the first outwardly slanted portion (a), and the pipe (P) is molded to have the same profile as that of the molding space. The measured values and wall thickening rates are 6.5 mm, 43% at the top (a"), 6.5 mm, 47% at the second outwardly slanted portion (c) and 5.8 mm, 41% at the top (c").

It is apparent that the above-mentioned second wall thickening effect serves to keep the friction between the pushed pipe wall (P) and the shaped surfaces of molding space to as small a value as possible while allowing the pipe wall to pass through the second outwardly slanted portion. This ensures an excellent molding efficiency. Since the frictional resistance is still kept low at the second wall thickening effect stage, the softened PVC pipe can be further moved through the molding space to attain the third wall thickening effect, which simply teaches a feature of PVC pipe processing method of present invention.

The outwardly slanted portions to which the pipe is molded by the above-mentioned processing method of the present invention have angles relative to the longitudinal axis thereof ranging from 15° to 60°, usually from 25° to 45°. Corresponding to these angles, the angles of outwardly slanted portions which are to be formed on the outer surface of core are selected, and the most important effective angle of the inwardly slanted portion connecting the top of the one outwardly slanted portion with the valley portion of the other outwardly slanted portion is directed in the negative direction, preferably in the range of 1°–5°. This negative angle allows for the full effect to be attained according to the distance between the front and rear outwardly slanted portions, even if the angle is smaller than 1° and nearer to 0°. Or if the negative angle corresponds to or is larger than the above-mentioned values of the outwardly slanted portions, the above-described wall thickening effect can be fully utilized.

The method of processing the plastic pipe to a socket is carried out using a molding device which will be described below. A large amount of pressure exerted from the softened plastic pipe which is pressed into the molding space formed according to the present invention causes this molding device to be self-locked, thus allowing the molding face to be accurately stabilized. This stable molding face serves to uniformly maintain the deformation of pipe wall forceable moved through the molding space and prevents an unuseful increase in friction resistance and partial excessive deformation, with the result of preventing a crease from being caused on the socket wall.

In FIGS. 4 through 7. reference numeral 41 represents a supporting or guiding shaft, to the foremost end of which is attached a base member 42. Reference numeral 43 denotes a head cap, which is fixed to the base member 42 by means of bolts 44. The rear end 71 of this head cap 43 projects from the rear end of base member 42.

Figure 6:
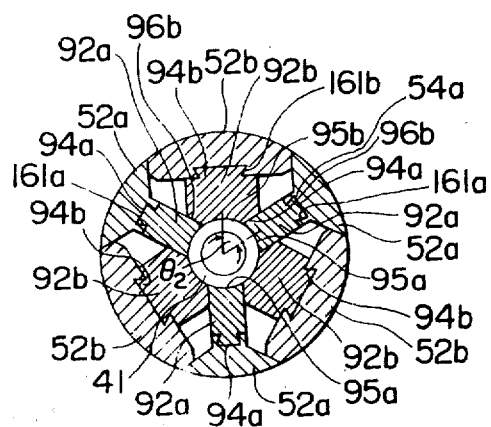
FIGS. 6 and 7 are sectional views taken along the lines VI—VI and VII—VII in FIG. 5, respectively.
Figure 7:
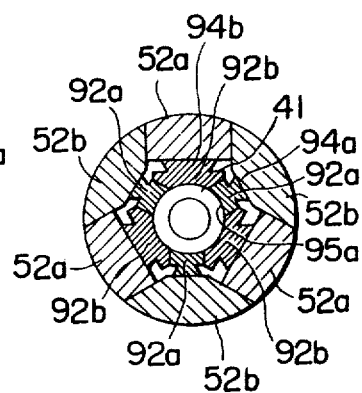

Reference numeral 45a represents a first moving element comprising several fingers 92a arranged around a ring portion 91a with the same angle therebetween. In the Figures three fingers are arranged with an angle of 120° interposed therebetween. Each of fingers 92a is positioned closer to shaft 41, as it comes near to the foremost end thereof, thus forming a tapered upper face 93a. As shown in FIGS. 6 and 7, an engaging rail 94a is formed on the tapered upper face 93a. Each of fingers 92a has a recess 580a formed in the underside of the rear end thereof.

Numeral 45b represents a second moving element comprising several fingers 92b arranged with the same angle therebetween around a ring portion 91b. The number and the tapered angle of fingers 92b are selected to the same as those of fingers 92a of first moving element 45a. As shown in FIGS. 6 and 7, an engaging rail 94b is also formed on the tapered upper face 93b of each finger 92b of second moving element 45b.

An apparent from FIGS. 6 and 7, each finger 92a of first moving element 45a is rectangular in the cross section thereof and the bottom face 95a thereof has an arc corresponding to the circumference of shaft 41. Each finger 92b of second moving element 45b is polygonal in the cross section thereof having slopes 96b at both lower sides thereof with which the lower sides of finger 92a of first moving element 45a are brought into contact, and also having an arc on the bottom face 95b thereof corresponding to the circumference of shaft 41.

Figure 5:
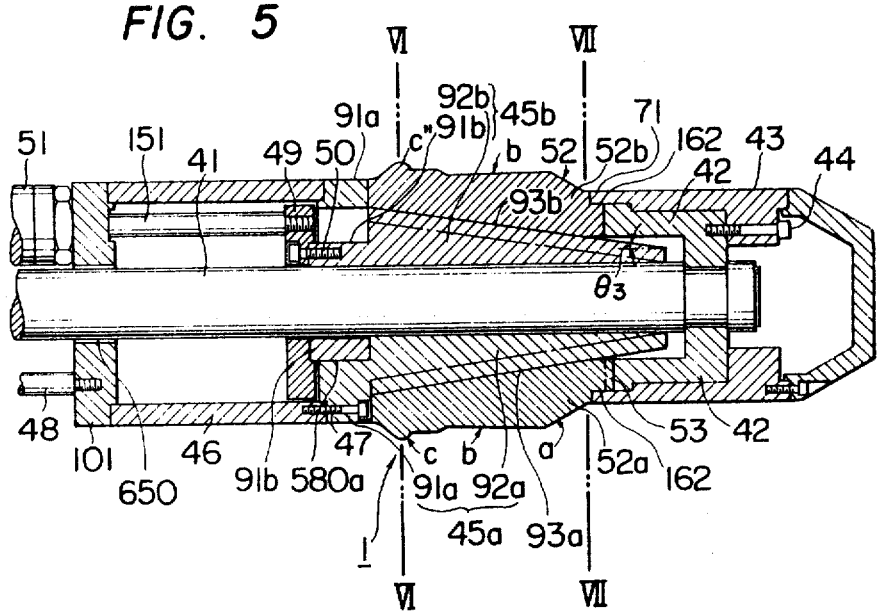
FIG. 5 is a longitudinally sectioned view showing the main components of the molding device shown in FIG. 4.

The first and second moving elements 45a and 45b are freely movably arranged on the shaft 41. The fingers of both moving elements are arranged alternately as shown in FIGS. 6 and 7 while the ring portion 91b of second moving element 45b is housed in the ring portion 91a of first moving element 45a as shown in FIG. 5. The recess 580a of ring portion 91a of first moving element 45b serves to house the ring portion 91b of second moving element 45b.

A sleeve 46 is connected to the ring portion 91a of first moving element 45a by means of bolts 47 and has an end plate 101 provided with a through hole 650, through which the shaft 41 is inserted. Reference numeral 48 represents a piston rod of hydraulic cylinder (not shown) and the piston rod is connected to the end plate 101. A flange 49 is fixed to the ring portion 91b of second moving element 45b by means of bolts 50. A hydraulic cylinder 51 is supported by the end plate 101 of sleeve 46 and the piston rod 151 thereof is connected to the flange 49.

Divided core pieces 52 have a profile and are dimensioned corresponding to the molding space which is used to carry out the processing method of present invention and which molds the plastic pipe end to a predetermined socket. Where are provided on the outer face of core pieces a mountain or flange portion (c") for forming a rubber ring attaching channel to the socket and an inwardly slanted portion (b) for forming a reverse taper to the socket such that the mountain portion (c") is maximum in height. The Figures illustrate employment of six divided core pieces. The divided core pieces 52 comprise alternately combining the first kind of divided core pieces 52a with the second kind of divided core pieces 52b.

As shown in FIG. 6, each divided core piece 52a of the first kind is freely slidably engaged with the rail 94a of each finger 92a of first moving element through a dove-tail groove 161a provided on the bottom face of piece 52a, while each divided core piece 92b of the second kind is also freely slidably engaged with the rail 94b of each finger 92b of second moving element through a dove-tail groove 161b provided on the bottom face of piece 52b.

As shown in FIG. 5, a notch groove 162 is formed on the front end surface of each of divided core pieces 52a and 52b of first and second kinds and engaged with the projection 71 of head cap 43. The front end of each divided core piece 52a is connected to the base member 42 so as to freely slide in the radial direction, and the connecting mechanism 53 thereof is substantially the same as for the one of fingers and divided core pieces.

As shown in FIG. 4, each divided core piece 52a of the first kind becomes narrower as it comes near the rear end thereof the, while each divided core piece 52b of second kind becomes wider as it comes nearer the rear end thereof.

In the device of present invention there is a certain relation between the angle ($\theta_1$ in FIG. 4) relative to the change in width of divided core pieces 52a and 52b of the first and second kinds, the angle ($\theta_2$ in FIG. 6) at which divided core pieces 52a and 52b of first and second kinds are arranged alternately, and the tapered angle ($\theta_3$ in FIG. 5) of upper face 93a or 93b of fingers 92a and 92b. This relation will be made clear from the description of radius shortening operation using the molding device.

Figure 8A:
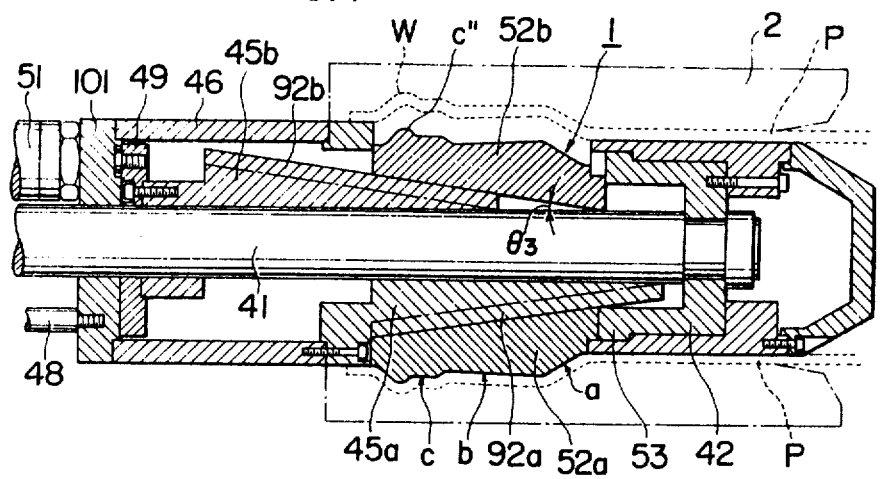
FIG. 8A is a sectional view showing a first retreated condition of the molding device upon comming out of the socket.
Figure 8B:
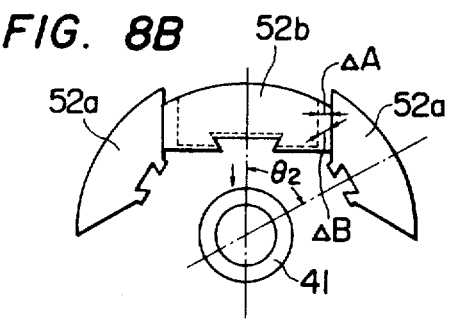
FIG. 8B is a cross sectional view showing the positions of divided core pieces under the first retreated condition of FIG. 8A.

Upon carrying out the radius shortening operation using the molding device, the hydraulic cylinder 51 is initially operated, and the second moving element 45b is shifted together with the flange 49 thereof in the direction of end plate 101 of sleeve 46, as shown in FIG. 8A. Because of the retreating movement of second moving element 45b, the divided core piece 52b of second kind is allowed to be positioned toward the center of supporting shaft 41, as shown in FIG. 8B. At the stage at which the above-mentioned positioning movement is completed, the mountain portion (c") of the divided core pieces 52b of second kind is positioned inside and apart from the socket (W) shown in dotted line in FIG. 8A.

Figure 8C:
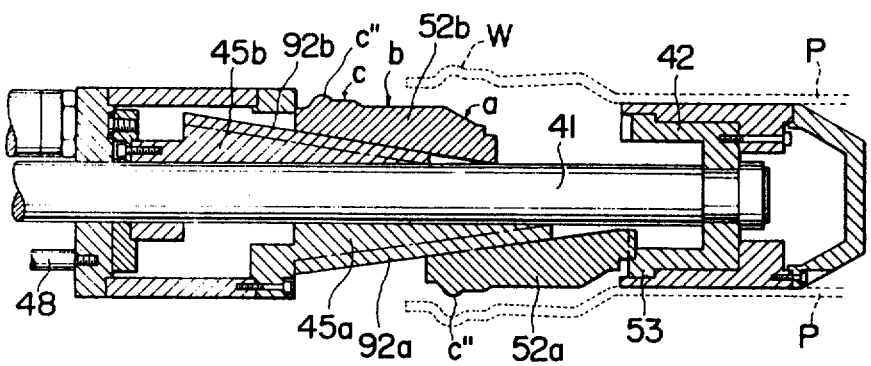
FIG. 8C is a sectional view showing the molding device in a ready state for being drawn out of the socket after a second retreating movement.

After the above operation, piston rod 48 is shifted by the hydraulic cylinder thereof, and the fingers 92b, 92a of second and first moving elements 45b, 45a are synchronizingly shifted as shown in FIG. 8C.

The divided core piece 52b of the second kind slidably engaged with the tapered upper face of finger 92b of second moving element 45b is not connected to the base member 42, so that, following shifting movement of second moving element 45b, the divided core piece 52b can be shifted by horizontal component force exerted from the tapered face of finger 92b. On the other hand, the divided core piece 52a of first kind slidably engaged with the tapered upper face of finger 92a of first moving element 45a is connected at the front end thereof to the base member so as to move in the radial direction, so that following the shifting movement of first moving element 45a, the divided core piece 52a of the first kind can move only toward the center of shaft 41.

For the purpose of uniformly attaining the retreating or shifting movement of divided core pieces 52b of the second kind and the movement of the divided core pieces 52a of first kind toward the center of shaft 41 or, in other words, for the purpose of uniformly attaining the radius shortening movements following the synchronizingly retreating movement of first and second moving elements, a certain relation is established between the angle ($\theta_1$ in FIG. 4) relative to the change in width of divided core pieces 52a and 52b of the first and second kinds, the angle ($\theta_2$ in FIG. 6) at which the divided core pieces of the first and second kinds are arranged alternately, and the tapered angle ($\theta_3$ in FIG. 5) of upper faces of fingers. This relation can be understood from FIG. 8B.

In FIG. 8B, the dotted line shows the condition under which the divided core piece 52b of second kind is temporarily shifted only by $\Delta l$, and a gap $\Delta A$ is created between the divided core pieces 52b and 52a of the second and first kinds due to the retreating movement of divided core piece 52b of the second kind. $\Delta A$ can be expressed as follows:

$$\Delta A = \tan \theta_1 \cdot \Delta l$$

The radius shortening direction of divided core pieces 52a of the first kind is restricted by $\theta_2$ and a gap $\Delta B$ relative to this direction is $\Delta A / \sin \theta_2$. Accordingly, $$\Delta B = \frac{\tan \theta_1 \cdot \Delta l}{\sin \theta_2}$$

On the other hand, since the first and second moving elements 45a and 45b are synchronizingly shifted or retreated as described above, the first moving element 45a also moves only by Δl, following the shifting or retreating movement of second moving element 45b, which creates the shifting or retreating movement Δl of divided core pieces 52b of the second kind, and the radius shortening movement Δl of divided core pieces 52a of the first kind subsequent to the retreating movement of first moving element 45a can be expressed as follows:

$$\Delta C = \tan \theta_3 \cdot \Delta l$$

The equilibrium condition between the radius shortening movement of divided core pieces of first kind and the retreating movement of divided core pieces of second kind can be expressed to be $\Delta B \geq \Delta C$, and therefore an equation can be established wherein:

$$\tan \theta_1 / \sin \theta_2 \geq \tan \theta_3$$

It is preferable in the device of present invention that $\theta_1$, $\theta_2$, and $\theta_3$ are determined to meet this equation.

At the stage of operation shown in FIG. 8C, the divided core pieces 52b of the second kind is shifted or released, as described above, from the molded socket (W) by the retreating movement of piston rod 48, and the release of these divided core pieces 52b can be smoothly attained because the flange or mountain portion (c″) thereof is made lower than the position of socket (W).

The equation $\tan \theta_1 / \sin \theta_2 \geq \tan \theta_3$ was obtained in the above description, assuming that the tapered angles of upper faces of fingers of the first and second moving elements were equal to each other and that these tapered angles were $\theta_3$. However, both tapered angles may be different from each other and, in this case, an equation corresponding to the above-mentioned one can be easily obtained from the above-described operation of device.

The pipe end socket processing method of present invention can be carried out using this molding device. The end portion of plastic pipe is heated and this heated end portion of pipe is pressed from the side of head cap 43 onto the divided core pieces 52 of the molding device, or into a space which is formed between the core and an outer frame by positioning the outer frame over the divided core pieces 52 and the head cap 43, said space being made equal to the pipe wall thickness of plastic pipe or thicker than that to have a described thickness. pipe of vinyl chloride having a caliber of 150 mm θ and a thickness of 8.9 mm was used. The above-described angles $\theta_1$, $\theta_2$ and $\theta_3$ in the core assembly were in the range of 3°–11°, 60° and 4°–12°, respectively. The space between the core 1 and the outer frame 2 was 10.5 mm. Under these conditions the first value of pressure for pressing the pipe to the state shown in FIG. 3B was in the range of 500–1000 kg. The second value of pressure needed to finish the molding process as shown in FIG. 3C was 10,000 kg.

As described above, the first value of pressure as well as the second value of pressure are substantially high and therefore, the core pieces of the first and second kinds forming the core assembly are subjected to a high external pressure exerted from the pipe.

However, as shown in FIG. 5, the divided core pieces 52a of the first kind which become wider towards their front ends will not shift or retreat because they are connected to the base member 42 so as to move only in the direction of shortening the radius. Since there divided core pieces 52a of the first kind are contacted with the tapered faces 93a of fingers 92a of the first moving element 45a, the divided core pieces 52a serve to press the fingers 92a of first moving element 45a onto the supporting shaft 41 by the vertical component force responsive to the tapered angle $\theta_3$ of tapered face 93a.

On the other hand, the divided core pieces 52b of the second kind being, different from the divided core pieces 52a of the first kind, are not connected to the base member 42, but rather only contacted with the rear end ring portion 91a of first moving element 45a. However, as described above, this first moving element 45a is pressed onto the supporting shaft 41 by the vertical component of force exerted from the divided core pieces 52a of the first kind according to the pushing pressure of the end portion of plastic pipe and therefore, can be stabilized better than in the case where the fixing condition of first moving element 45a depends only on the piston rod 48. Accordingly, the divided core pieces 52b of the second kind can also be stably fixed without shifting or retreating movement against the pushing pressure of end portion of plastic pipe.

The fixing condition of divided core pieces 52b of the second kind has a relation to the fixing condition of second moving element 45b which supports the divided core pieces 52b by the tapered faces 93b of fingers 92b, and also to the fixing condition of first moving element 45a which supports the rear ends of divided core pieces 52b of the second kind by the ring portion 91a thereof. Therefore, the piston rods 48 and 151 can be reduced in their function to fix and stabilize the divided core pieces 52b of the second kind. It is difficult in the hydraulic cylinder to completely fix the piston rod because of compression and contraction of oil.

As apparent from the discussion above, in this molding device the pushing pressure of an end portion of plastic pipe can be effectively utilized to fix the first moving element and this first moving element supports the divided core pieces of the second kind against the pushing pressure so that the divided core pieces of second kind can be stably fixed in the same manner as in the case of the divided core pieces of the first kind. Accordingly, the divided core pieces can be effectively prevented from sliding away from one another, and a socket, excellent in inner shape and dimensional accuracy, can be formed.

In a simpler device as shown in FIG. 9, the finger 92b of second moving element 52b is attached directly to a ring portion 910 and a rod 1510 attached to the finger 92a of first moving element 52a is passed through the ring portion 910 with a flange 490 attached to the other end thereof such that flange 490 can slide on the supporting shaft 41. The ring portion 910 engaged with the hydraulically driven piston 480 is drawn by this piston to allow the second moving element 52b to be operative to perform the first shifting or retreating movement and the first moving element 52b to be operative through the flange 490 to perform the second shifting or retreating movement.

The divided core pieces 52a and 52b of the first and second kinds when subject to a large pressure exerted from the pipe, which is being pressed onto and around the core assembly of these divided core pieces, serve to forceably contact the fingers 92a and 92b to the support shaft 41 through their slanted bottom faces. The stresses on these slanted bottom faces and supporting shaft are balanced on a plane substantially parallel to the horizontal direction in which the pipe is pushingly pressed and do not balance the pipe pressure on a plane substantially perpendicular to the direction of pipe pressure, so that the circumferential contact between the divided core pieces 52a and 52b of first and second kinds is uniformly strengthened according to the pipe pressure. In addition, in the case where the circumferentially contacted sides of adjacent core pieces are arranged to have an angle, as described above, relative to the axial line of supporting shaft 41, these circumferentially contacted sides create a higher and higher contact pressure and receive the pipe feeding pressure, thus enabling the assembled condition of core pieces to be well kept and the high accuracy of molding profile to be maintained. As apparent from the above, the position of molding profile is not supported on the plane perpendicular to the horizontal direction in which the pipe is forcedly fed, but rather by the friction or urging pressure of long planes substantially parallel to the horizontal direction. Therefore, the accuracy of molding profile including the inwardly slanted portion which is important in the method of processing the end of the plastic pipe to a socket can be excellently maintained. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A molding device for processing the end of a plastic pipe to form a pipe end socket comprising:
    a plurality of core pieces divided in a ring to form an inner molding surface for processing the pipe end socket; and
    means for expanding and/or contracting the core pieces to form an inner molding surface upon expanding and/or to allow the core pieces to pass through a processed shape of the pipe end socket upon contracting wherein said expanding means further comprises:
    a guiding shaft upon which said core pieces are mounted;
    first and second finger members, each having a bottom face portion sliding and supported on said guiding shaft, and also having an upper face portion;
    said plurality of core pieces further comprising at least a first and second core piece corresponding to first and second finger members, respectively, bottom face portions of said core pieces being slidably supported by the respective upper face portions of said first and second finger members for shifting between expanded and contracted positions, and an upper face portion of said first and second core pieces having an inwardly slanted portion formed thereon for forming the pipe end socket upon expanding of said first and second core pieces;
    first and second restraining ring members for combining and supporting end sides of said first and second finger members, respectively, wherein said second restraining ring member is housed within said first restraining ring member; and
    means for moving one of said first and second restraining ring fingers a first predetermined distance;
    means for moving the remaining ring member of said first and second restraining ring members a second predetermined distance after moving said one ring member of said first and second restraining ring members said first predetermined distance, wherein the core piece moved by said first finger member is radially outwardly or inwardly shifted to different positions on said guiding shaft a predetermined time which differs in time with respect to the movement of the core piece moved by said second finger member, such that the radially outermost portion of said inwardly slanted portion of said first and second core pieces is positioned radially inwardly of a radially innermost surface portion of the processed pipe end socket.

2. A molding device according to claim 1, wherein end portions of each of said first and second core pieces are concentrically supported about said guiding shaft by said first and second restraining ring members, respectively.

3. A molding device according to claim 1, further comprising sleeve means operatively connected to said first and second restraining ring members wherein said second restraining ring member and a portion of said guiding shaft are mounted within said sleeve means.

4. A molding device for processing the end of a plastic pipe to form a pipe end socket comprising:
    first and second divided core pieces contacted alternately in a ring to form an inner molding face for a processing and molding space,
    first and second finger members corresponding to the first and second divided core pieces, respectively, each finger member having a tapered upper face freely slidably engaged with each respective first and second divided core piece allowing said divided core pieces to be raised or lowered in the radial direction of the pipe, and also having a bottom face;
    first and second ring-shaped restraining members which further comprise ring-shaped end portions of each of said first and second finger members, one of said first and second ring-shaped restraining members having a circumferential side thereof in contact with corresponding side portions of said first and second divided core pieces;
    a guiding shaft having a guiding surface slidably contacted with each bottom face of said first and second finger members, and
    an operation member including means for moving a remaining ring-shaped member of said first and second ring-shaped restraining members a first predetermined distance and means for moving said one of said first and second ring-shaped restraining members a second predetermined distance after said remaining ring-shaped member of said first and second ring-shaped restraining members is moved said first predetermined distance, wherein the divided core pieces moved by one of said first and second finger members is raised or lowered at different positions on said guiding shaft at a point in time which differs relative to the divided core pieces being moved by the other of said first and second finger members such that through use of the force exerted from the pipe, the divided core pieces, around which the heat softened plastic pipe is fed, enable the bottom faces of said first and second finger members to be self-locked into the guiding shaft through the tapered faces thereof whereby the inner molding face formed by the divided core pieces is stabilized.

5. A molding device for processing the end of a plastic pipe to form a pipe end socket comprising:
- first and second divided core pieces contacted alternately in a ring to form an inner molding face for a processing and molding space,
- first and second finger members corresponding to the first and second divided core pieces, respectively, each finger member having a tapered upper face freely slidably engaged with each respective first and second divided core piece allowing said divided core pieces to be raised or lowered in the radial direction of the pipe, and also having a bottom face,
- a ring-shaped restraining member connected to said second finger member, said ring-shaped restraining member having a circumferential side thereof in contact with a corresponding side portion of said second divided core piece;
- a guiding shaft having a guiding surface slidably contacted with each bottom face of said first and second finger members; and
- an operation member for moving said ring-shaped restraining member and said second member wherein one of said divided core pieces is raised or lowered at different positions on said guiding shaft by movement of said ring-shaped restraining member and said second finger member, wherein said operation member further comprises a flange member slidably mounted in the guiding shaft, means for connecting said flange member to said first finger member, and means operatively associated with said flange for moving said flange at a point in time which differs relative to movement of said ring-shaped restraining member such that through use of the force exerted from the pipe, the divided core pieces, around which the heat-softened plastic pipe is fed, enable the bottom faces of said first and second finger members to be self-locked onto the guiding shaft through the tapered faces thereof whereby the inner molding face formed by the divided core pieces is stabilized.

6. The molding device as set forth in claims 4 or 5 wherein
the angle $\theta_1$, relative to the change in width of the divided core pieces, the angle $\theta_2$ at which the divided core pieces are radially alternately arranged on the guide shaft and the angle $\theta_3$ of the tapered upper face of the finger members have the relationship: $\tan \theta_1/\sin \theta_2 \geq \tan \theta_3$.

* * * * *